(12) United States Patent
Franke

(10) Patent No.: US 6,917,906 B2
(45) Date of Patent: Jul. 12, 2005

(54) METHOD AND COMPUTER SYSTEM FOR CARRYING OUT A SIMULATION

(75) Inventor: Torsten Franke, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 697 days.

(21) Appl. No.: 09/927,861

(22) Filed: Aug. 10, 2001

(65) Prior Publication Data

US 2003/0028510 A1 Feb. 6, 2003

(30) Foreign Application Priority Data

May 25, 2001 (DE) .......................... 101 25 610

(51) Int. Cl.$^7$ .......................... G06F 17/10; G06F 17/16
(52) U.S. Cl. .......................... 703/2; 706/46
(58) Field of Search .......................... 703/2, 14, 20; 706/46

(56) References Cited

U.S. PATENT DOCUMENTS

| | | | | | |
|---|---|---|---|---|---|
| 5,963,447 A | * | 10/1999 | Kohn et al. | ................... | 700/49 |
| 6,006,022 A | * | 12/1999 | Rhim et al. | ................... | 716/1 |
| 6,088,689 A | * | 7/2000 | Kohn et al. | ................... | 706/10 |
| 6,606,588 B1 | * | 8/2003 | Schaumont et al. | ......... | 703/15 |
| 6,684,219 B1 | * | 1/2004 | Shaw et al. | ............. | 707/103 R |

OTHER PUBLICATIONS

IEEE Trans. CAD of Integrated Circuits and Systems, "i/Tem: A Temperature–Dependint Electromigration Reliabilit Diagnosis Tool", Chin–Chi Teng et al., vol. 16, No. 8, Aug. 1997, S. 882–893.
Modellierung und Simulation nichtelektrischer Systeme., Dr. Ulrich Becker et al., Elektronik 1, 1997, pp. 70–75.
Accurate Algorithm For Temperature Calculation of Devices in Nonlinear–Circuit–Analysis Progreams, Electronics Letters, Sep. 21, 1972, vol. 8, No. 19, pp. 470–472.
Transient Thermal Modeling and Characterization of a Hybrid Component, Filip Christiaens et al., Electronic Components and Technology Conference, 1996, Proceedings, 46$^{th}$ , 1996, pp. 154–164.
Multi–Nature–Systems 2001, by R. Martin et al., Workshop, 2001m Hamburg, Feb. 21, 2001, pp. 33–42.
Dresdener Arbeitstagung "Schaltungs– und Systemsimulation", DASS '98, Dresden, May 28, 1998.
Kosim, A Multi–Level Simulator for the Design of Integrated Circuits; H. Reichl, Micro System Tedhnologies 90, pp. 85–90, Springer, Berlin 1990.
Einfuhrung in die Mikrosystemtechnik, Grundlagen und Praxisbeispiele; F. Volklein. Th. Zetterer, Vieweg–Verlag, Seiten 292–326.
Behavioral Modeling of Complex Heterogeneous Microsystems; P. Schwarz, J. Haase, S. pp. 53–62.
Thermal Modelling of Semiconductor Packages, T. Franke, U. Froehler, S. pp. 193–198.

* cited by examiner

Primary Examiner—Kevin J. Teska
Assistant Examiner—Mary C. Hogan
(74) Attorney, Agent, or Firm—Baker Botts L.L.P.

(57) ABSTRACT

In an integrated simulation method and system, first points, which are subjected to a first entity, and second points, with a second entity as the output variable, are defined. The second points are subdivided into a first subset and a second subset, and the second points of the first subset are subjected to a similar operation. The calculation of the transfer functions between pairs of points takes place with a simulation program, so that corresponding matrices of transfer functions result. Corresponding matrices are also generated with regard to further entities. The corresponding vector models and matrices can be linked up with one another to generate flexible system models.

14 Claims, 4 Drawing Sheets

METHOD AND COMPUTER SYSTEM FOR CARRYING OUT A SIMULATION

FIELD OF THE INVENTION

The invention relates generally to a method and system for carrying out a simulation and more particularly relates to a system and method of integrating various simulation tools.

BACKGROUND OF THE INVENTION

Various computer programs for carrying out simulations are known in the prior art. Many of such programs are based on the finite elements method. Such computer programs are also referred to as CAD, CAE, EDA and EDM tools. Providers of such tools include, for example, the companies ANSYS, INC., CADENCE DESIGN SYSTEMS, INC., FLOMERICS, INC., ITI GmbH Dresden, SimLab Software GmbH and The Mathworks, Inc.

Such computer programs are used for simulation and design purposes in all technical areas including for the simulation of technical components and systems. For example, the software of the company ITI GmbH allows the modeling of various systems such as electrical-mechanical drive trains, internal-combustion and hybrid drives in motor vehicles, ships, transporting equipment, machines, gear and brake systems, belt conveying installations; the modeling of mechatronic systems, feed drives in machine tools, positioning systems, converter lockup systems; the controller optimization of hydraulic drive systems, pump and winch drives, valve modeling and activation and also the simulation of brake or clutch actuating systems and testbed simulation.

One particularly important area for the use of simulation tools is the area of electrical engineering and electronics. In particular, such tools are frequently used during the design of electrotechnical and electronic equipment and circuits. For the simulation of different aspects of the device or circuit concerned several different simulation tools are often used. For example, one simulation tool is required to simulate the thermal heating caused by the power loss of currents in a device while another simulation tool is required for the simulation of its mechanical properties.

One disadvantage of the simulation tools known from the prior art is that, without being integrated with one another, they address only a partial aspect with regard to the simulation and design process.

It has been attempted by what are known as co-simulations to describe the problems to be simulated in a simplified manner on a common platform (Schwarz, P.: KOSIM—A multi-level simulator for the design of integrated circuits. In: H. Reichl (Ed.): Proc. MICRO SYSTEM Technologies, September 10–13, Springer, Berlin 1990, pp. 85–90).

In co-simulation, behavioral models are processed. However, the creation of such behavioral models requires knowledge of the basic behavior of the object to be described (cf. Völklein, F.; Zetterer, T.: Einführung in die Mikrosystemtechnik. Grundlagen und Praxisbeispiele [Introduction to microsystem technology. Principles and practical examples], Vieweg-Verlag, Wiesbaden 2000, pp. 292–326; Schwarz, P.; Haase, J.: Behavioural Modeling of Complex Heterogeneous Microsystems; Proc. 1st Intern. Forum on Design Languages (FDL'98), Lausanne, September 1998, vol. 2, 53–62; Schwarz, P.: Modellierung und Simulation heterogener Systeme [Modeling and simulation of heterogeneous systems] set of transparencies; Dresden conference on "Schaltungs und Systemsimulation" [switching and system simulation] DASS'98, Dresden, May 25, 1998; Franke, T.; Fröhler, U.: Thermal Modelling of Semiconductor Packages; Proc. Therminic'00 Workshop, Budapest, Sep. 25–27th, 2000).

One disadvantage of known simulation methods with co-simulators, is that the automated routines are restricted with respect to their application. As a result, the creation of generally usable library elements is not possible on account of the restricted areas of validity of these models and a restricted locational resolution. The application of these simulation tools, and their linking up, is therefore restricted to selected application.

Further examples of known simulation tools include fluid simulators, thermal simulators, switching simulators, simulators for investigating electromagnetic compatibility (EMC), mechanical simulators and further CAx, EDA and EDM tools.

OBJECTS AND SUMMARY OF THE INVENTION

It is an object of the present invention to provide an improved method and system for simulation.

The problem on which the invention is based is solved by the features of the independent patent claims. Preferred embodiments are specified in the dependent patent claims.

The invention allows the results obtained by various simulation tools to be stored as library elements in a database. Individual library elements can then be accessed according to the question to be simulated, and the library elements can be combined with one another to create a simulation model with cross-domain applicability.

The system models or parts thereof, obtained in this way can in turn be transferred into permanent or temporary library elements. This allows the degree of abstraction for definable system areas to be changed and the size of the matrix to undergo computation to be reduced without loss in accuracy.

In a preferred embodiment, in the operation of bringing the library elements together, known as the merger, apart from performing the computation tasks for the purposes of the simulation, the result matrix is expanded and graphics are generated for the graphic presentation of the simulation result.

It is of particular advantage in this case that a simplified simultaneous computation of different physical domains or entities of systems of any desired complexity is made possible without loss of resolution or information.

Furthermore, the invention provides a link with a development database, in which the library elements are stored together with the general properties of the objects and which the various simulation computer programs can also access. In this case, the elements and objects may be stored in the database directly or as attributive references to other sources accessible by computer (for example via a hyperlink). The database can also be made available to other tools—such as for example other data ports, simulators and devices for machine control. This allows an entirely computer-aided development process to be created, with the inclusion of the various stages of the value creation chain (vertical integration) and what is known as concurrent engineering (horizontal integration).

Furthermore, the standardized and computationally reduced model structure allows complete integration in the technical systems themselves, such as for example in a machine control system.

The variable degree of abstraction of the system models generated and linked together from library elements is of particular advantage. The linking of the various simulation programs via a database system with corresponding library elements allows the various simulation programs to be brought together onto a common platform while fully preserving the benefits of the individual special simulation programs. This allows incompatible interfaces between the various special simulation programs to be eliminated.

It is also possible to use different simulation programs of the same simulation tool. In this case, it is of particular advantage that the overall amount of computation can be reduced by the use of library elements as compared with the conventional use of the tool. This is attributable to the library elements or the systems of equations reproduced in them being dimensionally reduced in comparison with the conventional use of a standard tool.

Furthermore, a simulation model created in accordance with the invention may itself again be the basis for the application of the method according to the invention for creating a further-abstracted system model.

A further advantage is the minimization of the overall amount of computation which is brought about by the possibility of removing irrelevant matrix elements from the matrices containing the transfer functions. This simplifies the simulation of complex systems. This advantage exists both in the case of the use of a single matrix or library element and when two or more matrices or library elements are linked up to form a system model.

In particular, the reduction in the amount of computation also allows the models to be linked up with automation systems, so that a machine model for the purposes of open-loop and closed-loop machine control results directly from the design process.

Furthermore, the invention also allows collaboration between remote users, such as over the Internet. For example, simulation tasks can be distributed in a specifically directed manner along the value creation chain. For instance, the creation of a library element may take place at the premises of a supplier of a specific unit. The customer can then include this library element in the simulation database, in order to generate flexible system models automatically, according to the relevant question, using the library elements made available by the supplier.

BRIEF DESCRIPTION OF THE FIGURES

The invention is explained in more detail below on the basis of a preferred exemplary embodiment. In the drawing.

DETAILED DESCRIPTION OF PREFERRED EMBODIMENTS

Figure 1:
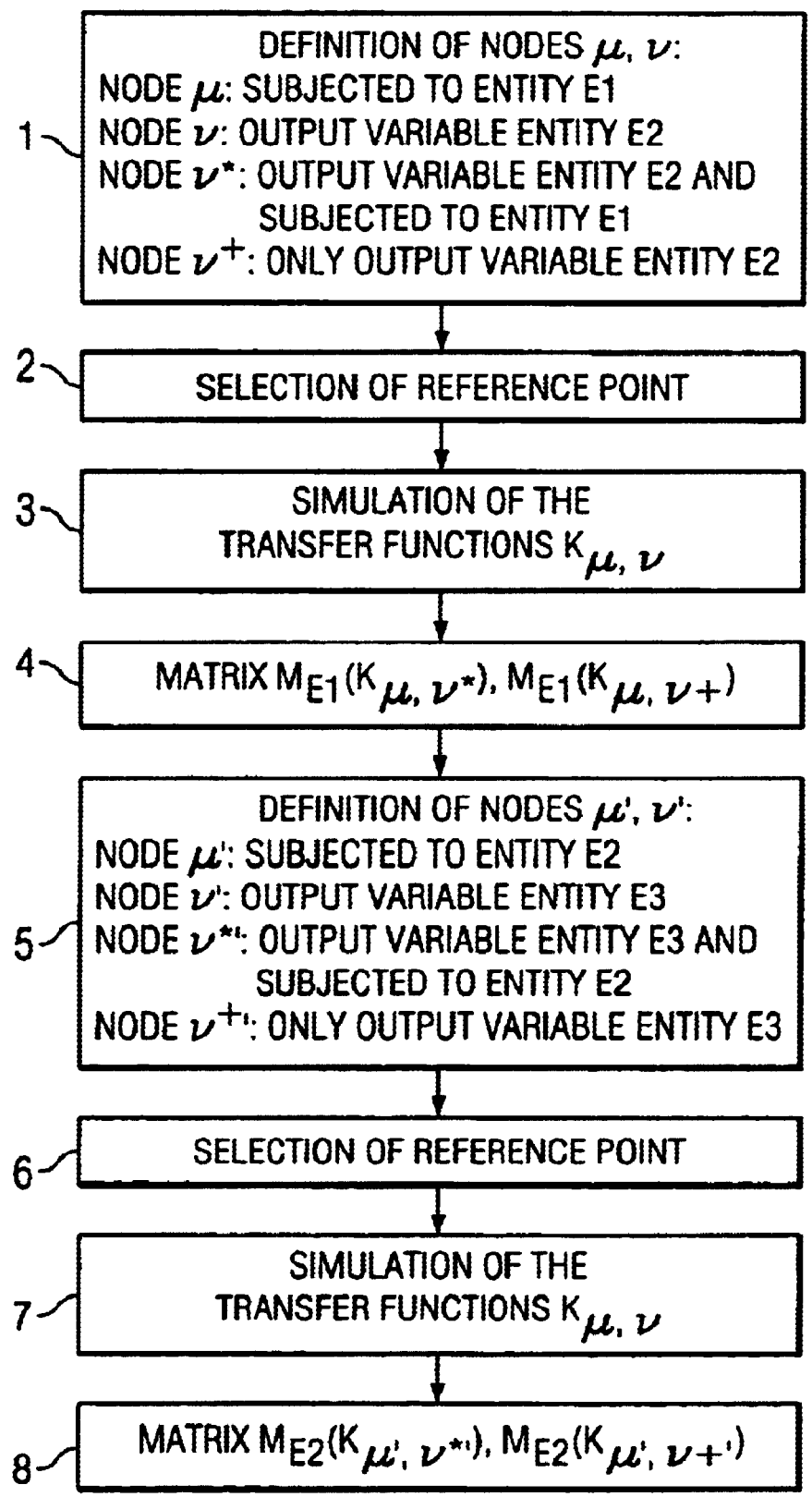
FIG. 1 is a flow diagram of an exemplary embodiment of a method according to the invention.

FIG. 1 is a flow diagram illustrating the creation of various library elements for the purposes of simulation. In step 1, first of all the nodes $\mu$ and v of a vector model are defined with regard to the simulation of a relationship between an entity E1 and an entity E2.

The term entity is understood hereafter to mean a specific variable, for example a physical, technical or some other variable. For instance, in the case of electric current and electric voltage, two different entities are concerned; entities may also concern temperature, thermal expansion, mechanical force, mechanical stress, fluidity, flow rate, frictional losses etc.

The node $\mu$ concerns those nodes of the vector model which may be subjected to an entity E1. The node v of the vector model, on the other hand, concerns nodes at which a resultant entity E2, for example the voltage, is output. In the case of the node v, a distinction is made between two subsets of nodes v* and v+.

The node v* concerns those nodes v which not only may have the output variable of the entity E2 taking place at the node in question but may also be subjected to the entity E1. On the other hand, the nodes v+ cannot be subjected to the entity E1; the nodes v+ serve merely for the output of the output variable of the entity E2 caused by the nodes $\mu$ being subjected to the entity E1.

In step 2, the selection takes place of any desired reference point of the vector model, which serves as a reference point for the system matrix and for the weighting of the response functions in the later simulation. In step 3, the simulation of the transfer functions $K_{\mu,v}$ then takes place. This involves, for example, selection of two nodes v,v and determination of the simulated transfer function with regard to this pair of nodes by means of a suitable simulation program. This takes place for all the possible pairs of nodes of the vector model defined in step 1.

In step 4, the transfer functions $K_{\mu,v}$ obtained in step 3 are combined in matrices $M_{E1}(K_{\mu,v*})$ and $M_{E1}(K_{\mu,v+})$. The matrices $M_{E1}(K_{\mu,v*})$ and $M_{E1}(K_{\mu,v+})$ thus describe the transfer behavior of the system with regard to being subjected to the entity E1 as the input variable and the entity E2 as the output variable. For further computations, the matrices may also be represented as scatter matrices, chain matrices or in some other form. Corresponding representations are known from Gerstenmaier et al. Proceedings of the 4th International Conference on Modeling and Simulation of Microsystems (MSM2001), Mar. 19–21, 2001, pp. 84–87. The first-mentioned matrix in this case comprises those transfer functions $K_{\mu,v}$ which result from pairs of nodes of nodes $\mu$ and nodes v*. On the other hand, the second matrix $M_{E1}(K_{\mu,v+})$ comprises those transfer functions $K_{\mu,v}$ which result from pairings of nodes $\mu$ and nodes v+. The two matrices generated in this way are then stored in a database.

In step 5, the definition of a further vector model with regard to the effect of the entity E2 on an entity E3 then takes place. The definition of the vector model takes place in step 5 in a way analogous to the procedure in step 1 with regard to the nodes $\mu$' and v'. In a corresponding way, the selection of a further desired reference point takes place in step 6 and the simulation of the corresponding transfer functions $K_{\mu',v'}$ takes place in step 7. For the simulation of the transfer functions in step 7, a further specialized simulation program, which can simulate the relationship between the entity E2 and the entity E3, is used.

In a way analogous to step 4, the output of the corresponding matrices $M_{E2}(K_{\mu',v'*})$ and $M_{E2}(K_{\mu',V+'})$ then takes place in step 8.

Figure 2:
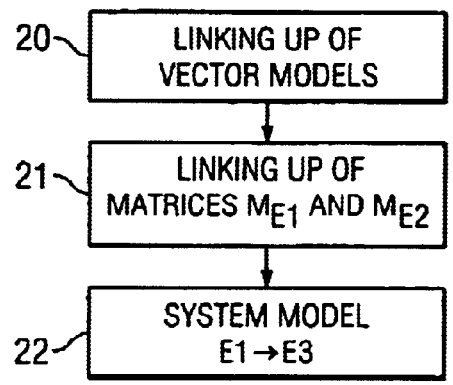
FIG. 2 is a flow diagram of an exemplary embodiment for generating a system model from library elements.

FIG. 2 illustrates the steps for combining the library elements of the database generated in steps 4 and 8 of FIG.

1. In step 20, the linking up of the vector models takes place. This is performed by assignment of the corresponding input and output variables. For example, a subset of the nodes v may serve as input variables for the nodes $\mu'$ of the second vector model with regard to the mapping of the entity E2 onto the entity E3 (cf. FIG. 1, steps 1 and 5).

In a way corresponding to the linking up of the vector models in step 20, a linking up of the corresponding matrices takes place in step 21. This linking up of the matrices results in step 22 in a system model for the simulation of the relationship between the entity E1 and the entity E3. In this case, it is particularly advantageous that this system model can be generated automatically from the previously generated library elements, without further simulations being required.

Figure 3:
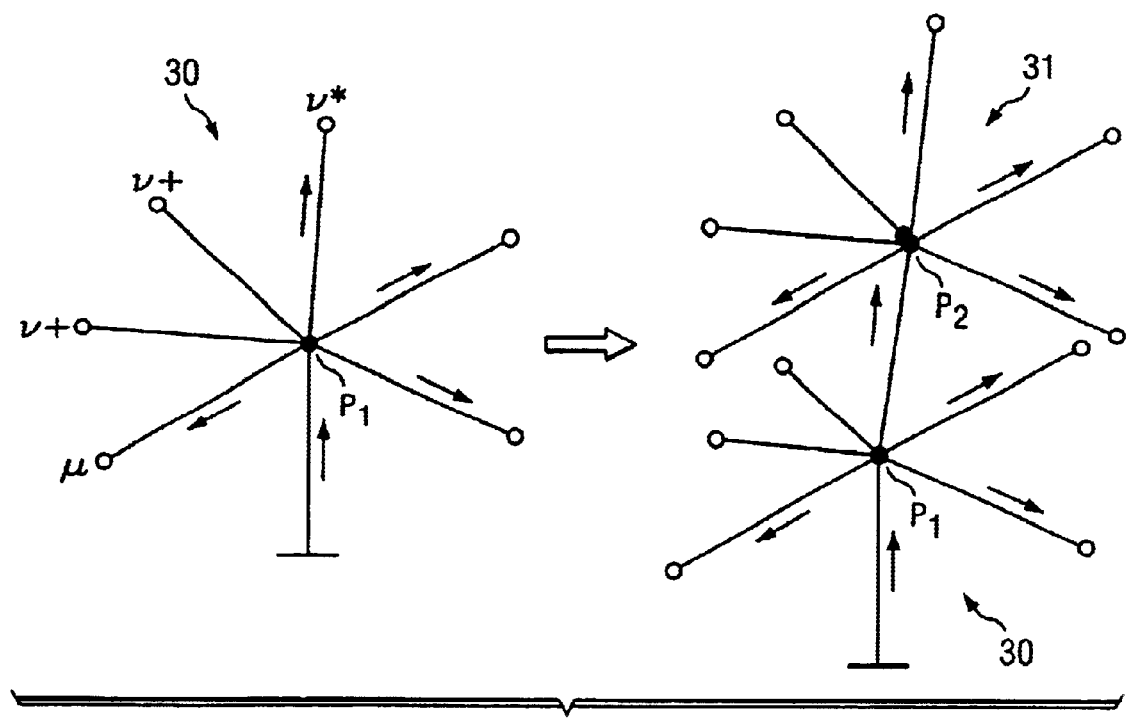
FIG. 3 is a pictorial diagram showing the linking up of two vector models.

FIG. 3 shows a vector model 30 with a reference point $P_1$ and nodes $\mu$, $v^*$ and $v^+$. The arrows in the connections between the reference point and the corresponding nodes define the direction from which they are subjected to the entity E1. By definition, the nodes $v^+$ are not subjected to the entity E1.

Furthermore, FIG. 3 shows the linking up of the vector model 30 with a further vector model 31. The vector model 30 in this case corresponds for example to the vector model which was defined in step 1 of FIG. 1. The vector model 31 corresponds for example to the vector model defined in step 5 of FIG. 1. In the example considered, the linkup of the vector models takes place via their reference points $P_1$ and $P_2$.

The generation of the matrices or library elements, for example, the matrices $M_{E1}(K_{\mu,v^*})$ and $M_{E1}(K_{\mu,v^+})$ in steps 4 and 8 of FIG. 1, may in this case take place by a node $\mu$ being subjected to a unit step $F_{reference-\mu}$. The transfer function $K_{\mu,v}$ can then be determined from the response $\Delta D$ to the unit step, determined between the point v and the reference point $P_1$ or $P_2$.

$$K_{\mu,v}(t) = \Delta D_{reference-v}(t) / F_{reference-\mu}(t) \mid \forall \mu, v$$

$$F_{reference-\mu}(t<0) = 0; \; F_{reference-\mu}(t \geq 0) = \text{const} \neq 0$$

$$\mu \in \{v \mid \exists F_{reference-v} \neq 0\}$$

For each pair of nodes, such a transfer function $K_{\mu,v}$ is separately determined, so that altogether a number of $\mu^*v$ matrix elements is obtained.

One possible computation routine for calculating the output variables and the nodes $v^*$ by means of boundary conditions $K_{v^*-equilibrium}(t)$ and the transfer functions when induced by a function $F_{v^*}(t)$ is given below:

$$\Delta D_{reference-v^*}(t) = \sum_{\mu=1}^{n} (K_{\mu v^-}(t) * F_\mu(t)) \bigg| \forall v^*$$

$$D_{v^*}(t) = K_{v^*-equilibrium}(t) * F_{v^*}(t) + D_{equilibrium}(t) \mid \forall v^*$$

$$D_{reference}(t) = D_{v^*}(t) + \Delta D_{reference-v^*}(t) \mid \forall v^*$$

$$F_{reference}(t) = \sum_{v^*=1}^{n} F_{v^*}(t)$$

$$v^* \in \{v \mid \exists F_{reference-v} \neq 0\}$$

With regard to the formulas given above, it is presupposed that the reference point $P_1$ or $P_2$ does not lie at a node which is assigned to a boundary condition $K_{v^*-equilibrium}(t)$. In principle, however, an entirely free choice of the reference point is possible. With a free choice of the reference point and with the nodes $\mu$ subjected to feeding, the following extended system of equations is obtained:

$$\Delta D_{reference-v^*}(t) = \sum_{\mu=1}^{n} (K_{\mu v^*}(t) * F_\mu(t)) \bigg| \forall v^*$$

$$D_{v^*}(t) = K_{v^*-equilibrium}(t) * F_{v^*}^K(t) + D_{equilibrium}(t) \mid \forall v^*$$

(changed indexing for F(t))

$$D_{reference}(t) = K_{reference-equilibrium}(t) * F_{reference}^K(t) + D_{equilibrium}(t) \quad \text{(in addition)}$$

$$D_{reference}(t) = D_{v^*}(t) + \Delta D_{reference-v^*}(t) \mid \forall v^*$$

$$F_{reference}(t) = \sum_{v^*=1}^{n} F_{v^*}(t)$$

$$F_{v^*}(t) = F_{v^*}^K(t) + F_{v^*}^U(t) \mid \forall v^* \quad \text{(in addition)}$$

$$F_{reference}(t) = F_{reference}^K(t) + F_{reference}^U(t)$$

$$v^* \in \{v \mid \exists F_{reference-v} \neq 0\} \quad \text{(in addition)}$$

with $K_{reference-equilibrium}(t)$—boundary condition at the reference node $$F_{reference}^K(t);$$

$F_{v^*}{}^K(t)$—component of the inducing function $F_{reference}(t)$ or $F_{v^*}(t)$ which is dependent on the respective boundary condition $K_{reference-equilibrium}(t)$ or $K_{v^*-equilibrium}(t)$ $$F_{reference}^U(t);$$

$F_{v^*}{}^U(t)$—component of the inducing function $F_{reference}(t)$ or $F_{v^*}(t)$ which is independent of the respective boundary condition $K_{reference-equilibrium}(t)$ or $K_{v^*-equilibrium}(t)$.

For this calculation, only $\mu^*v^*=\mu^2$ instead of $\mu^*v$ matrix elements are required. The remaining $\mu(v-v^*)$ elements do not contribute to the actual solution and can therefore be removed from the matrix.

An example of an expansion routine for the determination of the elements not to be considered in the calculation is given below:

$$\Delta D_{reference-v+}(t) = \left|\sum_{\mu=1}^{n}(K_{\mu v+}(t) * F_{\mu}(t))\right| \forall\, v^+$$

$$v^+ \notin \{v \mid \exists\, F^-_{reference-v} \neq 0\}$$

Furthermore, an expansion routine for the determination of variables not explicitly considered in the model, with reference back to known object properties, is given below:

$$f_v^{grad} = -\lambda_v \cdot grad D_v \mid \forall\, v$$

$$f_v^{div} = div f_v^{grad} \mid \forall\, v$$

In this case, the gradient is a direct result of the above calculation and $\lambda_v$ is an object attribute which can be called up from the database.

Figure 4:
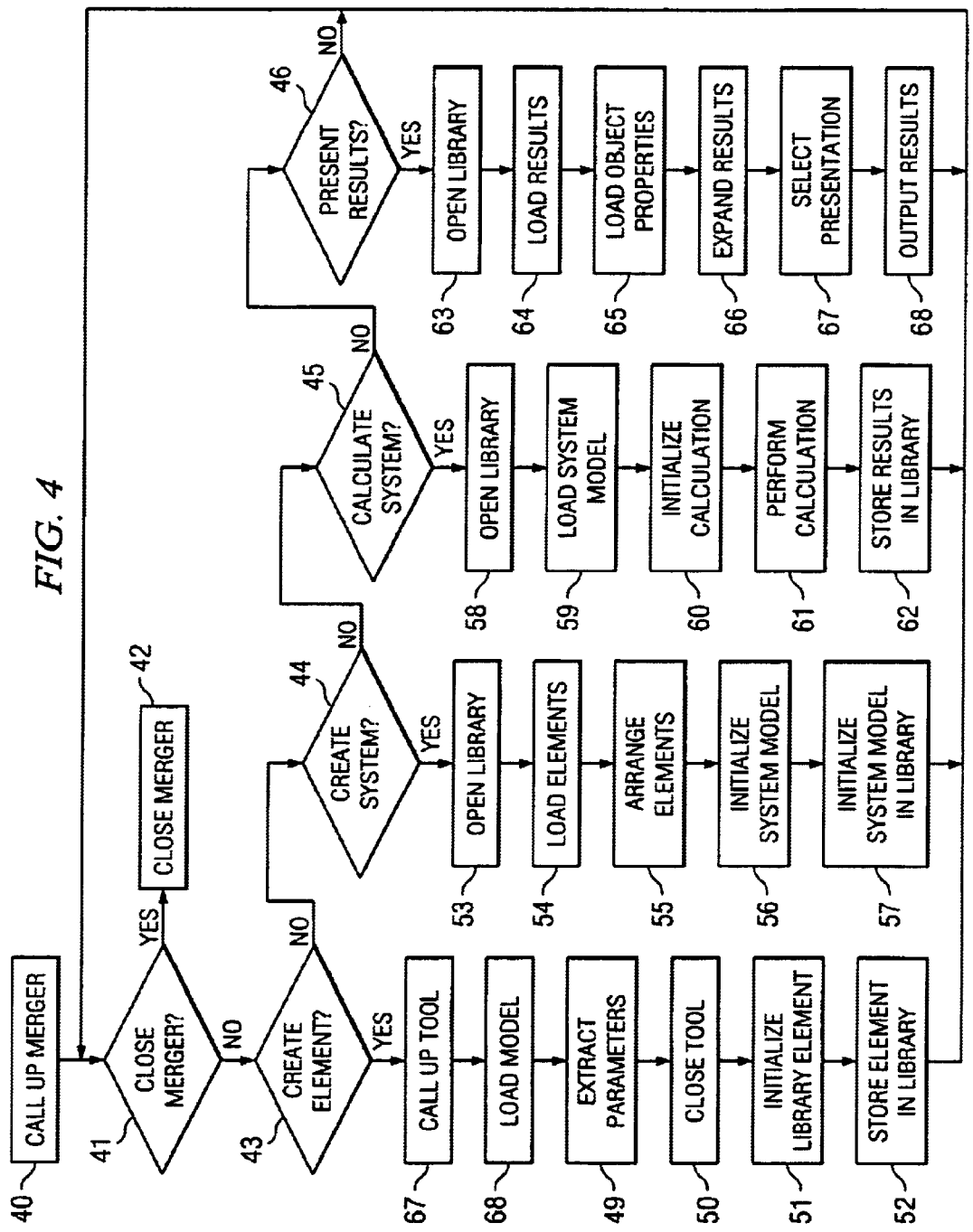
FIG. 4 is a flow diagram of a simulation system.

FIG. 4 shows a flow diagram of an integrated system for the creation of library elements, for the creation of system models, for carrying out simulations and for the output of simulation results, which integrates various simulation programs with one another.

In step 40, the "merger", that is to say the integrated simulation method, is called up. In step 41, it is determined whether the program is to be closed again. If this is the case, the closing of the program takes place in step 42.

In steps 43, 44, 45 and 46, the desired operating mode of the program is then called up. In step 43, the "create element" mode can be chosen for the creation of a new library element. In step 44, the "create system" mode, in which a system model is created and stored in the library, can be chosen.

In step 45, the "calculate system" mode, in which a simulation using a system model is loaded from the library and the output of the result being stored into the library takes place, can be selected. In step 46, the "present results" mode can be chosen. In this mode, the results are loaded from the library and output in the desired format.

If the "create element" mode is chosen in step 43, the corresponding tool is called up in step 47 and the corresponding vector model is loaded in step 48. In step 49, the transfer functions for the corresponding model are determined by way of a corresponding specialized simulation program and are extracted as parameters.

In step 50, the tool is closed again and, in step 51, the library element is initialized. The library element is then stored in a database library in step 52.

If the "create system" mode is chosen in step 44, the corresponding database library is opened in step 53 and the required library elements or matrices are loaded in step 54. In step 55, these elements are arranged for linking up with one other, so that an initialization of the system model can take place in step 56. This system model is stored in the database library in step 57.

If the "calculate system" mode is chosen in step 54, the corresponding database library is again opened in step 58, in order to load the previously generated system model in step 59.

In step 60, the calculation for the simulation by means of the system model is initialized and the corresponding calculation is performed in step 61. The results of the calculation are stored in the database library in step 62.

If the "present results" mode is chosen in step 46, the database library is again opened in step 63, in order again to load the results previously stored in step 62. Furthermore, the object properties are loaded in step 65, in order to carry out an extension of the results in step 66. In step 67, the user can select the type of presentation of the output or the presentation format. In step 68, the results are then output in the desired presentation.

To simplify use of the integrated simulation system further, it can also be made accessible via a browser over the Internet. This arrangement facilitates the implementation of linked-up applications.

If a database library with library elements generated in advance already exists, individual functionalities (create element, create system, calculate system, present results) can also be used independently and/or in parallel.

Figure 5:
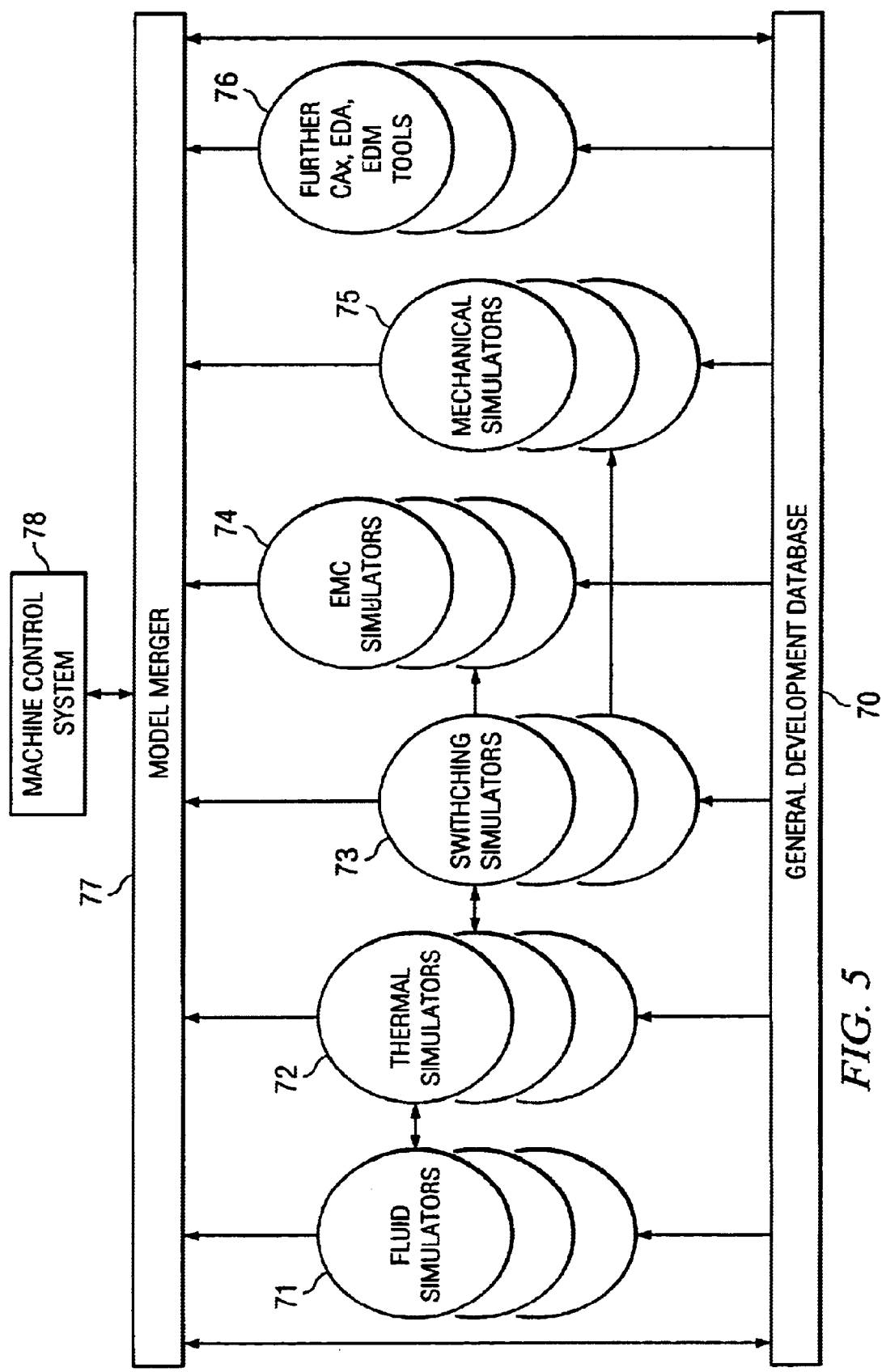
FIG. 5 is a simplified block diagram showing the incorporation of various simulators into the simulation system.

FIG. 5 shows a block diagram of the connection of the merger tool of FIG. 4 to various simulation programs. The system of FIG. 5 has a general development database 70, in which various data for the purposes of the development of a technical system or a technical component are stored. Textual information, drawings and further related data can also be stored in the database 70.

The simulation programs 71 to 76 including the fluid simulator 71, thermal simulator 72, switching simulator 73, EMC simulator 74, mechatronic simulator 75 and further CAx, EDA and EDM tools 76, access the general development database 70. These simulation programs 71 to 76 are likewise connected to the merger tool 77.

This arrangement creates an integrated development environment, which allows even unskilled users to perform complex simulation tasks. The output of the merger tool 77 may in this case be used to load a machine model generated by the merger tool 77 into the machine control system 78. Furthermore, the merger tool 77 is also connected to the general development database 70, in order to store the results of the merger tool 77 in the general development database 70.

I claim:

1. A method for creating a database for carrying out a technical simulation, comprising the steps of:
   a) determining first and second entities within a technical application representing a physical or technical value respectively;
   b) providing a first vector model comprising a plurality of first nodes which are subjected to the first entity, and second nodes, with the second entity as the output variable, the second nodes being subdivided into a first subset and a second subset, and the second nodes of the first subset being also subjected to the first entity,
   c) determining the transfer functions between one of the first nodes and one of the second nodes in each case, by a first simulation program,
   d) storing a first matrix with the transfer functions between the first nodes and the second nodes of the first subset and storing of a second matrix with the transfer functions between the first nodes and the second nodes of the second subset, and
   e) repeating steps a to d with regard to the second entity and a third entity, by a second simulation program.

2. The method as claimed in claim 1, further comprising:
   a) loading the first matrix and the second matrix,
   b) linking up of the first matrix and the second matrix for linking up the underlying vector models, and
   c) storing the linked-up first and second matrices as a system model.

3. A simulation method comprising:
   a) loading of a system model from a database created by a method as claimed in claim 2,
   b) initialization of the simulation, c) calculating the simulation with boundary conditions taken into consideration, and d) storing of the simulation results.

4. A simulation method as claimed in claim 3, in which the system model comprises only the first matrix.

5. A simulation method as claimed in claim 3, in which the system model comprises the linking up of at least the first matrix and the second matrix.

6. A method for presenting the results of a simulation comprising:

a) loading results of a simulation method as claimed in claim 3, b) expanding of the results, and c) generating graphic output of the results.

7. A computer program product on a computer-readable medium with computer-readable instructions for carrying out a method as claimed in claim 1.

8. A computer system programmed to perform the steps as claimed in claim 1.

9. A system for creating a database for carrying out a technical simulation, comprising:

means for determining first and second entities within a technical application representing a physical or technical value respectively;

means for providing a first vector model comprising a plurality of first nodes which are subjected to the first entity, and second nodes, with the second entity as the output variable, the second nodes being sub divided into a first subset and a second subset, and the second nodes of the first subset being also subjected to the first entity, a simulation program for determining the transfer functions between one of the first nodes and one of the second nodes in each case, means for storing a first matrix with the transfer functions between the first nodes and the second nodes of the first subset and storing of a second matrix with the transfer functions between the first nodes and the second nodes of the second subset.

10. The system as claimed in claim 9, further comprising:

means for loading the first matrix and the second matrix, means for linking up of the first matrix and the second matrix for linking up the underlying vector models, and means for storing the linked-up first and second matrices as a system model.

11. The system as in claim 10, further comprising:

means for loading of the system model from a database, initialization means for performing of the simulation, means for calculating the simulation with boundary conditions taken into consideration, and means for storing of the simulation results.

12. The system as claimed in claim 11, in which the system model comprises only the first matrix.

13. The system as claimed in claim 11, in which the system model comprises the linking up of at least the first matrix and the second matrix.

14. The system as claimed in claim 11, further comprising:

means for loading of the simulation results, means for expanding of the results, and means for generating graphic output of the results.

* * * * *